United States Patent
Min et al.

(10) Patent No.: US 10,873,105 B2
(45) Date of Patent: Dec. 22, 2020

(54) ELECTRODE FOR SECONDARY BATTERY AND LITHIUM SECONDARY BATTERY INCLUDING SAME

(71) Applicant: LG Chem, Ltd., Seoul (KR)

(72) Inventors: Ji Won Min, Daejeon (KR); Hoe Jin Hah, Daejeon (KR); Jong Keon Yoon, Daejeon (KR); Seok Koo Kim, Daejeon (KR); Yeo Kyung Yoon, Daejeon (KR); Janis Doelle, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 15/768,987

(22) PCT Filed: Jun. 14, 2017

(86) PCT No.: PCT/KR2017/006213
§ 371 (c)(1),
(2) Date: Apr. 17, 2018

(87) PCT Pub. No.: WO2017/217769
PCT Pub. Date: Dec. 21, 2017

(65) Prior Publication Data
US 2018/0301740 A1    Oct. 18, 2018

(30) Foreign Application Priority Data

Jun. 14, 2016  (KR) .................. 10-2016-0073967
Jun. 14, 2017  (KR) .................. 10-2017-0074716

(51) Int. Cl.
*H01M 10/052*    (2010.01)
*H01M 4/62*    (2006.01)
(Continued)

(52) U.S. Cl.
CPC ......... *H01M 10/052* (2013.01); *H01M 4/131* (2013.01); *H01M 4/505* (2013.01);
(Continued)

(58) Field of Classification Search
None
See application file for complete search history.

(56) References Cited

U.S. PATENT DOCUMENTS 10,541,410 B2    1/2020    Li et al.
2005/0266305 A1  12/2005   Ohata et al.
(Continued)

FOREIGN PATENT DOCUMENTS

CN    105098193 A    11/2015
JP    2006210003 A    8/2006
(Continued)

OTHER PUBLICATIONS

Extended European Search Report including the Written Opinion for Application No. EP 17813592.7 dated Jun. 28, 2019, 11 pages.
(Continued)

*Primary Examiner* — Ula C Ruddock
*Assistant Examiner* — Amanda Rosenbaum
(74) *Attorney, Agent, or Firm* — Lerner, David, Littenberg, Krumholz & Mentlik, LLP

(57) ABSTRACT

Provided are an electrode for a secondary battery and a manufacturing method thereof. According to the present invention, a secondary battery, which has high capacity and is also able to get an excellent evaluation in a nail penetration test so that stability is ensured, may be manufactured. In order to accomplish the above objectives, the present invention provides an electrode for a secondary battery which includes an electrode current collector; a first electrode active material layer formed on the electrode current collector; and a second electrode active material layer formed on the first electrode active material layer, wherein a layer composed of the electrode current collector and the first electrode active material layer has a tensile strain of 1.2% or less.

6 Claims, 3 Drawing Sheets

(51) Int. Cl.
*H01M 4/583* (2010.01)
*H01M 4/525* (2010.01)
*H01M 4/131* (2010.01)
*H01M 10/48* (2006.01)
*H01M 4/505* (2010.01)
*H01M 4/02* (2006.01)
*H01M 10/0525* (2010.01)
*H01M 4/66* (2006.01)

(52) U.S. Cl.
CPC ........... *H01M 4/525* (2013.01); *H01M 4/583* (2013.01); *H01M 4/623* (2013.01); *H01M 10/48* (2013.01); *H01M 4/661* (2013.01); *H01M 10/0525* (2013.01); *H01M 2004/021* (2013.01); *H01M 2004/027* (2013.01); *H01M 2004/028* (2013.01)

(56) References Cited

U.S. PATENT DOCUMENTS

| | | | |
|---|---|---|---|
| 2009/0297944 A1* | 12/2009 | Oh | H01M 2/26 429/179 |
| 2010/0266904 A1 | 10/2010 | Jeon et al. | |
| 2011/0027635 A1* | 2/2011 | Muraoka | H01M 4/13 429/94 |
| 2011/0177369 A1* | 7/2011 | Endo | H01M 2/1673 429/94 |
| 2015/0243966 A1 | 8/2015 | Endo et al. | |
| 2016/0013480 A1* | 1/2016 | Sikha | H01M 4/0404 427/126.6 |
| 2017/0092943 A1 | 3/2017 | Li et al. | |

FOREIGN PATENT DOCUMENTS

| | | |
|---|---|---|
| JP | 2007048744 A | 2/2007 |
| JP | 2008186704 A | 8/2008 |
| JP | 2009048876 A | 3/2009 |
| JP | 2010010094 A | 1/2010 |
| JP | 2010267475 A | 11/2010 |
| JP | 2010539640 A | 12/2010 |
| JP | 2013131330 A | 7/2013 |
| JP | 5400304 B2 | 1/2014 |
| JP | 2014049240 A | 3/2014 |
| JP | 2015179662 A | 10/2015 |
| JP | 2016024898 A | 2/2016 |
| KR | 100557714 B1 | 3/2006 |
| KR | 20080070206 A | 7/2008 |
| KR | 20110021974 A | 3/2011 |
| KR | 20110024114 A | 3/2011 |
| KR | 20110107504 A | 10/2011 |
| KR | 20140137660 A | 12/2014 |
| WO | 2005117169 A1 | 12/2005 |
| WO | 2016038438 A1 | 3/2016 |

OTHER PUBLICATIONS

Jung et al., "Understanding the Degradation Mechanisms of LiNi0.5Co0.2Mn0.3O2 Cathode Material in Lithium Ion Batteries", Advanced Energy Materials, vol. 4, Issue 1, Aug. 21, 2013 (Aug. 21, 2013), pp. 1-17, XP055597572, Retrieved from the Internet: URL:https://onlinelibrary.wiley.com/doi/full/10.1002/aenm.201300787 [retrieved on Jun. 18, 2019].

Search report from International Application No. PCT/KR2017/006213, dated Sep. 12, 2017.

Chinese Search Report for Application No. CN201780003721.X dated Jul. 3, 2020.

Wong et al., "Battery Separator Characterization and Evaluation Procedures for NASA's Advanced Lithium-Ion Batteries", May 1, 2010, 70 Pages, XP055608606.

* cited by examiner

【FIG. 1】
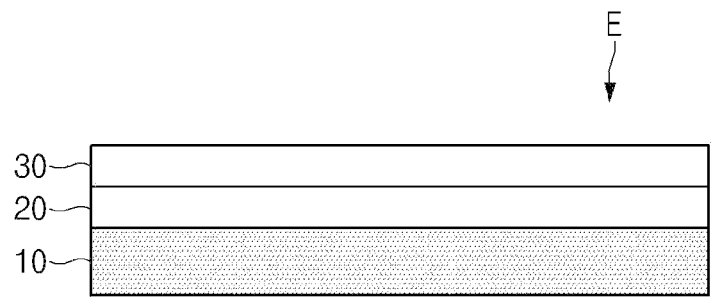
【FIG. 2】
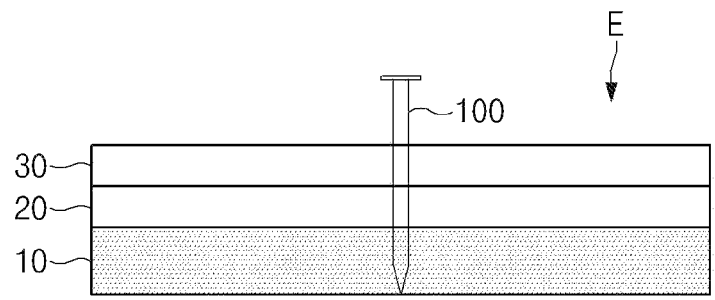
【FIG. 3】
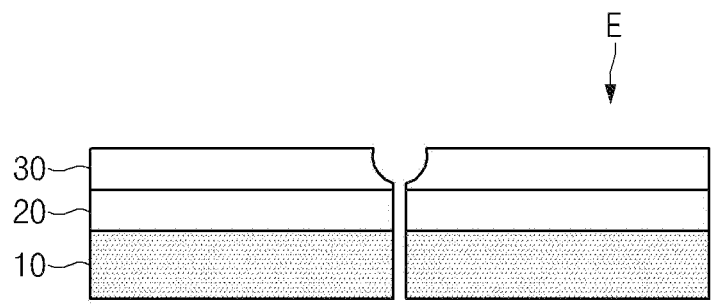

【FIG. 4】
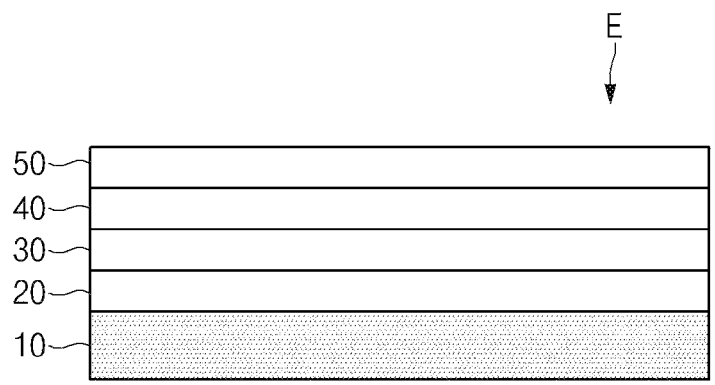
【FIG. 5】
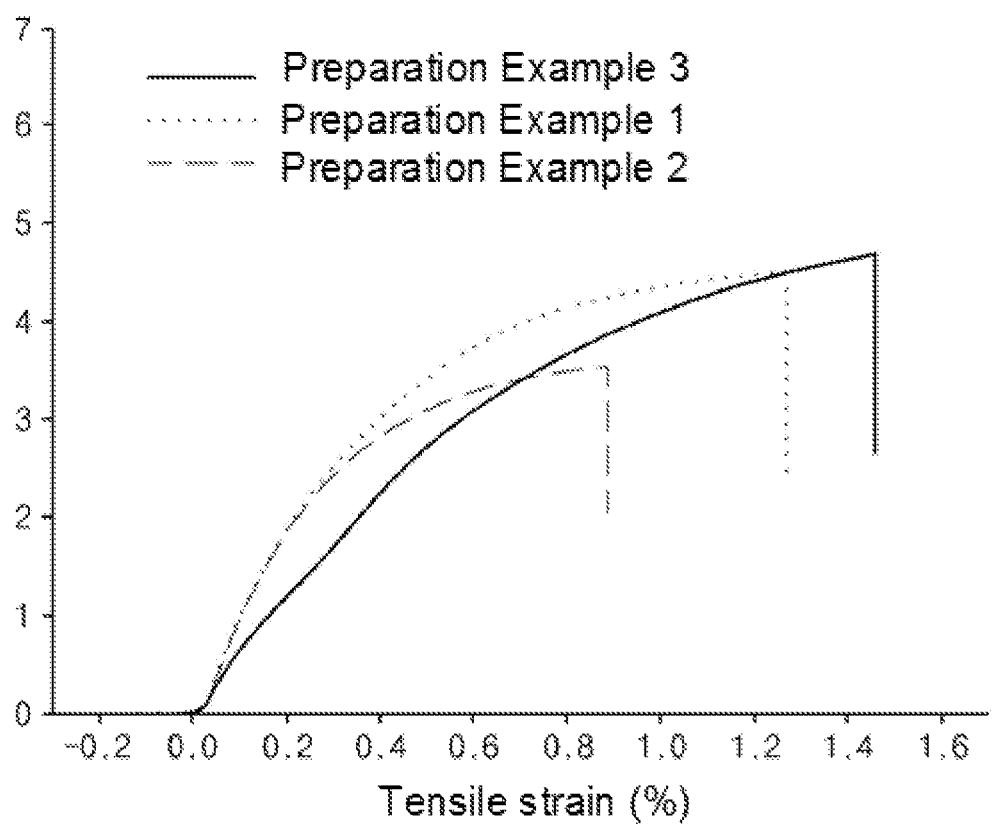

[FIG. 6]
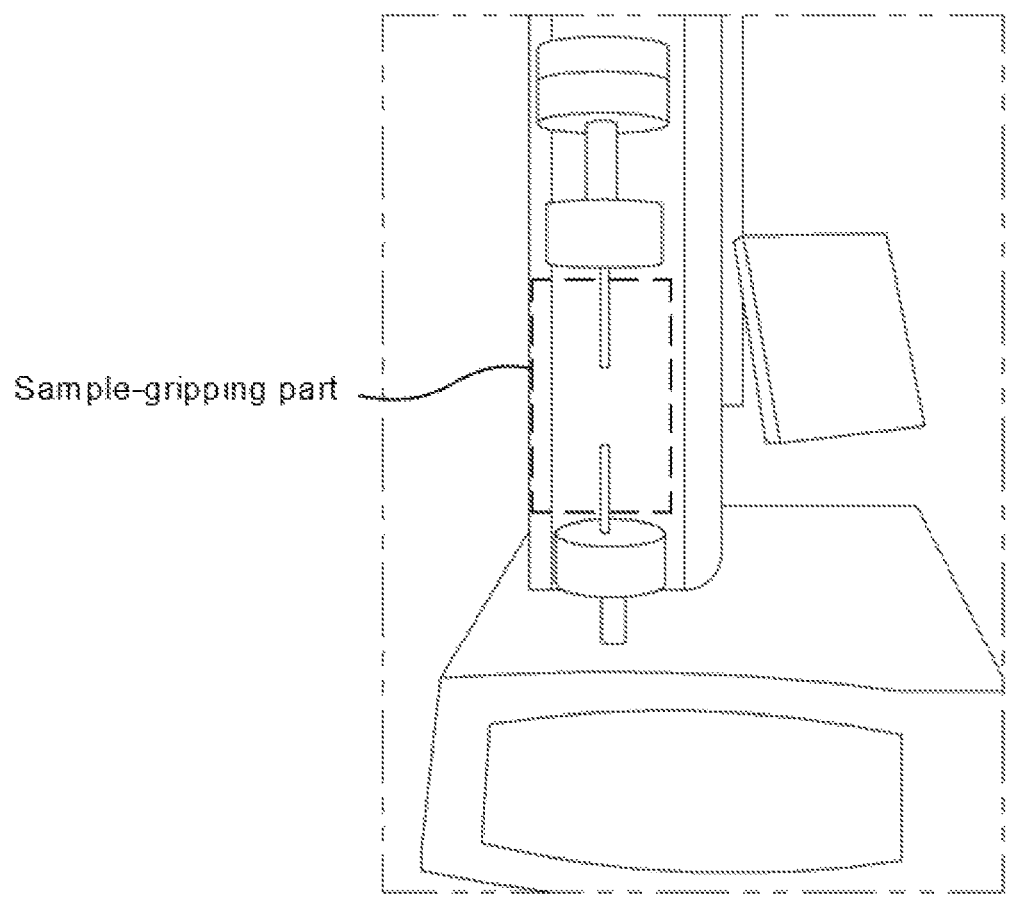

ELECTRODE FOR SECONDARY BATTERY AND LITHIUM SECONDARY BATTERY INCLUDING SAME

CROSS-REFERENCE TO RELATED APPLICATIONS

This application is a national phase entry under 35 U.S.C. § 371 of International Application No. PCT/KR2017/006213, filed Jun. 14, 2017, which claims priority to Korean Patent Application No. 10-2016-0073967, filed on Jun. 14, 2016, and Korean Patent Application No. 10-2017-0074716, filed on Jun. 14, 2017, the disclosures of which are incorporated herein by reference.

TECHNICAL FIELD

The present invention relates to an electrode for a secondary battery and a lithium secondary battery including the same, and particularly, to an electrode for a secondary battery which has a high capacity and also ensures stability, and a lithium secondary battery including the same.

BACKGROUND ART

In order to use electronic devices in which a secondary battery capable of repetitive charging and discharging is installed for a long time, a secondary battery having a higher capacity per unit area is preferable. However, a secondary battery needs to also ensure high stability to prevent damage or fire caused by an external impact or a rapid change in internal temperature or pressure.

As one item for evaluating the stability of a secondary battery, there is a nail penetration test. In the nail penetration test, whether or not heat-generation, ignition, explosion and the like of a secondary battery occur when a sharp material such as a nail or the like damages a secondary battery is tested. In order to pass the nail penetration test, when a sharp material damages a secondary battery through collisions therebetween, an electrode should be broken and thus short-circuited. This is because ignition or explosion does not occur when the electrode is broken.

Meanwhile, in recent years, a nickel-cobalt-manganese-based lithium oxide is frequently used as an electrode active material of a lithium secondary battery. Among them, a high-concentration nickel-cobalt-manganese-based lithium oxide including a large amount of nickel among transition metals realizes high energy density per unit volume, and thus is frequently used in medium- to large-sized batteries requiring high capacity. However, an electrode using a high-concentration nickel-cobalt-manganese-based lithium oxide as an electrode active material is not easily broken by an external impact due to its high elongation, which causes explosion or ignition of the electrode. In this case, elongation refers to a ratio at which a material is stretched in a tension test.

Therefore, the need for a secondary battery which has high capacity per unit area and simultaneously exhibits high safety is increasing.

PRIOR-ART DOCUMENT

Korean Patent No. 10-0557714

DISCLOSURE

Technical Problem

The present invention is designed to solve the problems of the prior art, and it is an aspect of the present invention to provide an electrode for a secondary battery which has high capacity and is also able to get an excellent evaluation in a nail penetration test, and a lithium secondary battery including the same.

Technical Solution

According to an embodiment of the present invention, there is provided an electrode for a secondary battery which includes an electrode current collector; a first electrode active material layer formed on the electrode current collector; and a second electrode active material layer formed on the first electrode active material layer, wherein a layer composed of the electrode current collector and the first electrode active material layer has a tensile strain of 1.2% or less.

In this case, the second electrode active material layer may have a higher energy density per unit volume than that of the first electrode active material layer.

In addition, each of the first electrode active material layer and the second electrode active material layer may include a lithium-transition metal oxide as an active material, and particularly, the lithium-transition metal oxide may be represented by Chemical Formula 1 below.

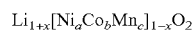
[Chemical Formula 1]

In Chemical Formula 1, $-0.2 \leq x \leq 0.2$, $0.5 \leq a \leq 0.98$, $0.01 \leq b \leq 0.4$, and $0.01 \leq c \leq 0.4$.

Meanwhile, the lithium-transition metal oxides included in the first electrode active material layer and the second electrode active material layer may have the same or different compositions.

The first electrode active material layer and the second electrode active material layer may have an energy density per unit area of 1 to 6 mAh/cm$^2$.

The first electrode active material layer may have a thickness of 15 to 150 µm, and the second electrode active material layer may have a thickness of 15 to 100 µm.

In addition, the electrode according to the present invention may further include, as necessary, a lithium ion-conductive layer laminated on the second electrode active material layer and containing a lithium ion-conductive gel swollen with a non-aqueous electrolyte; and a heat-resistant porous layer laminated on a surface of the lithium ion-conductive layer and containing insulating metal oxide particles.

Preferably, the electrode is a positive electrode.

According to an embodiment of the present invention, there is provided a lithium secondary battery including the electrode according to the present invention.

Advantageous Effects

An electrode according to the present invention includes two electrode active material layers, and thus can include a relatively large amount of active material compared to a conventional electrode including one electrode active material layer, and can prevent peeling from a current collector and migration of a binder so that high capacity can be stably realized.

In addition, in the electrode according to the present invention, an active material layer having low elongation is formed as a first electrode active material layer provided closer to a current collector so that a fracture property of the electrode increases when an external impact is applied, and thus excellent stability can be realized.

DESCRIPTION OF DRAWINGS

FIG. 1 is a diagram of an electrode for a secondary battery according to an embodiment of the present invention.

FIG. 2 is a diagram illustrating that an electrode for a secondary battery according to an embodiment of the present invention is subjected to a nail penetration test.

FIG. 3 is a diagram of an electrode after an electrode for a secondary battery according to an embodiment of the present invention has been subjected to a nail penetration test.

FIG. 4 is a diagram of an electrode for a secondary battery according to another embodiment of the present invention.

FIG. 5 is a graph illustrating an elongation of each of layers composed of current collectors and first electrode active material layers according to Preparation Examples 1 to 3.

FIG. 6 is a diagram of an elongation measurement device of the present invention.

BEST MODE

Hereinafter, the present invention will be described in detail with reference to the accompanying drawings.

FIG. 1 is a diagram of an electrode for a secondary battery according to an embodiment of the present invention.

As shown in FIG. 1, an electrode for a secondary battery E according to an embodiment of the present invention includes an electrode current collector 10, a first electrode active material layer 20 formed on the electrode current collector 10, and a second electrode active material layer 30 formed on the first electrode active material layer. In FIG. 1, an electrode active material layer is laminated on only one surface of the electrode current collector 10, but the present invention is not limited thereto. In the electrode E according to an embodiment of the present invention, an electrode active material layer may be laminated on both surfaces of the electrode current collector 10.

The electrode current collector 10 may be an electrode current collector generally used in the art, and types thereof are not particularly limited as long as it does not cause a chemical change in the battery and has conductivity. For example, the electrode current collector 10 is copper, stainless steel, aluminum, nickel, titanium, calcined carbon, or copper or stainless steel whose surface is treated with carbon, nickel, titanium, silver or the like, an aluminum-cadmium alloy or the like. Also, the electrode current collector may have fine irregularities at a surface thereof to increase adhesion to an active material layer, may be used in any of various forms such as a film, a sheet, a foil, a net, a porous material, a foam, a non-woven fabric and the like, and may have a thickness of 3 to 500 μm.

Meanwhile, in the electrode according to an embodiment of the present invention, a layer composed of the electrode current collector and the first electrode active material layer 20 has an elongation of 1.2% or less, preferably, 1.0% or less.

In this case, elongation refers to a ratio at which a material is stretched in a tension test, and a material having high elongation is more likely to be stretched without being broken by an external impact. That is, elongation is used as a measure of the fracture performance of a material. Therefore, a material having low elongation tends to be broken by an external impact, and a material having high elongation tends to be stretched without being broken by an external impact. Generally, elongation is affected by the material and thickness of a current collector, the thickness of a first electrode active material layer, a composition of a slurry constituting a first electrode active material layer, the type of active material used, a particle diameter of an active material, and the like. Therefore, when the above-described factors are appropriately adjusted, a layer composed of the electrode current collector and the first electrode active material layer may have an elongation within a desired range.

In the present invention, the elongation of a layer composed of the electrode current collector and the first electrode active material layer may be measured by the following method. First, a slurry for forming a first electrode active material layer is applied on an electrode current collector and dried to prepare a sample with a size of 15 mm (W)×150 mm (L). Afterward, the sample is mounted in a sample-gripping part of an elongation measurement device (e.g., Instron 3345 UTM) as shown in FIG. 6, and then pulled at a rate of 5 mm/min to measure tensile strain. In this case, tensile strain immediately before the sample is broken is determined as elongation.

As in the present invention, when a layer composed of a current collector and a first electrode active material layer has an elongation of 1.2% or less, the current collector and the first electrode active material layer are easily broken and short-circuited when an external impact caused by a sharp material is applied, and thus ignition or explosion of the battery may be effectively prevented.

FIG. 2 is a diagram illustrating that an electrode for a secondary battery according to an embodiment of the present invention is subjected to a nail penetration test, and FIG. 3 is a diagram of an electrode after an electrode for a secondary battery according to an embodiment of the present invention has been subjected to a nail penetration test. With reference to FIGS. 2 and 3, a technical effect of the electrode for a secondary battery according to an embodiment of the present invention in the nail penetration test will be described.

A secondary battery needs to ensure high stability to prevent damage or fire caused by an external impact or a rapid change in internal temperature or pressure.

As one of the measures for evaluating the stability of a secondary battery, there is a nail penetration test. In the nail penetration test, whether or not heat-generation, ignition, explosion and the like of a secondary battery occur when a sharp material such as a nail or the like damages a secondary battery is tested. In order to pass the nail penetration test, when a sharp material damages a secondary battery by penetrating the secondary battery, an electrode should be broken. This is because ignition or explosion does not occur when the electrode is broken.

Therefore, in order for a secondary battery to pass the nail penetration test, when a sharp material penetrates an electrode from the outside, an electrode active material layer or an electrode current collector needs to be easily broken. Therefore, in order to pass the nail penetration test, an electrode active material layer having lower elongation is preferable. This is because an electrode is easily broken as elongation is lower.

In the electrode according to the present invention, the first electrode active material layer 20 having low elongation is laminated adjacent onto the electrode current collector 10 so that a layer composed of the electrode current collector 10 and the first electrode active material layer 20 has an elongation of 1.2% or less, and thus an electrode can be easily broken in a nail penetration test or real life as shown in FIG. 3. That is, when a nail 100 penetrates the electrode E according to an embodiment of the present invention in a nail penetration test or real life, all of the electrode active material layers and the electrode current collector are broken as shown in FIG. 3, and thus a risk of heat-generation, fire, or explosion of a secondary battery may be prevented.

Meanwhile, the second electrode active material layer 30 formed on the first electrode active material layer 20 does not affect the fracturing of the electrode, and thus a material having high elongation compared to the first electrode active material layer 20 may be used. Therefore, when the electrode according to the present invention includes two electrode active material layers, a selection range for a material that may be used as the second electrode active material layer 30 is widened, and thus a degree of freedom of design of the electrode may be improved.

For example, but the present invention is not limited thereto, the second electrode active material layer 30 may have a higher energy density per unit area than that of the first electrode active material layer 20. In this case, a secondary battery having more excellent capacity with respect to the same volume compared to the case of an electrode including one electrode active material layer may be manufactured. That is, in the present invention, an electrode having both high capacity and excellent stability may be manufactured by forming an electrode active material layer with a two-layer structure, adjusting the elongation of a layer composed of an electrode current collector and a first electrode active material layer formed on the electrode current collector, which affects fracturing of the electrode, to a specific range, and forming an active material layer having excellent capacity as a second electrode active material layer.

For example, in the electrode according to the present invention, the first electrode active material layer may have an energy density per unit area of 1 to 6 mAh/cm$^2$, preferably 1 to 5 mAh/cm$^2$, and more preferably 1 to 4 mAh/cm$^2$. Also, the second electrode active material layer may have an energy density per unit area of 1 to 6 mAh/cm$^2$, preferably 2 to 6 mAh/cm$^2$, and more preferably, 3 to 6 mAh/cm$^2$. When the first electrode active material layer and the second electrode active material layer have energy densities within the above ranges, the electrode according to the present invention may be appropriately used in medium- to large-sized high-capacity battery cells, and a thickness of the electrode may be reduced due to a decrease in a loading amount per electrode weight.

Meanwhile, in the electrode according to an embodiment of the present invention, each of the first electrode active material layer and the second electrode active material layer preferably includes a lithium-transition metal oxide as an active material. Specifically, the lithium-transition metal oxide may be a nickel-cobalt-manganese-based lithium metal oxide represented by Chemical Formula 1 below.

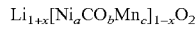  [Chemical Formula 1]

$$Li_{1+x}[Ni_aCO_bMn_c]_{1-x}O_2$$

In Chemical Formula 1, −0.2≤x≤0.2, 0.5≤a≤0.98, 0.01≤b≤0.4, and 0.01≤c≤0.4.

The nickel-cobalt-manganese-based lithium metal oxide represented by Chemical Formula 1 as an active material is a nickel-cobalt-manganese-based electrode active material including nickel among transition metals at 50 mol % or more. As such, as a larger amount of nickel is included in an electrode active material, the energy density per unit volume is higher, and thus a battery having high electric capacity may be manufactured. Specifically, the lithium-transition metal oxide may be Li[Ni$_{0.6}$Co$_{0.2}$Mn$_{0.2}$]O$_2$, Li[Ni$_{0.8}$Co$_{0.1}$Mn$_{0.1}$]O$_2$, or the like, but the present invention is not limited thereto.

In this case, the lithium-transition metal oxides included in the first electrode active material layer and the second electrode active material layer may have the same or different compositions. Specifically, all of the active materials included in the first electrode active material layer and the second electrode active material layer may be nickel-cobalt-manganese-based lithium metal oxides. In this case, contents of nickel, cobalt, and manganese included in the lithium-transition metal oxide may be the same or different from each other. As such, when lithium-transition metal oxides including the same elements are used as active materials in the first electrode active material layer and the second electrode active material layer, operating voltage is in an equal range, and thus a loss caused by a difference in operating voltage, which may occur when heterogeneous active materials are used, may be minimized. However, active materials included in the first electrode active material layer and the second electrode active material layer are only required to have homogeneous components, and contents of each component do not need to be the same.

In addition, the first electrode active material layer and the second electrode active material layer may further include, as necessary, a binder, a conductive material, a dispersant, or the like.

As the binder, any of various types of binder polymers such as a polyvinylidene fluoride-hexafluoropropylene copolymer (PVDF-co-HFP), polyvinylidene fluoride (PVDF), polyacrylonitrile, polymethyl methacrylate, polyvinyl alcohol, carboxymethyl cellulose (CMC), starches, hydroxypropyl cellulose, regenerated cellulose, polyvinyl pyrrolidone, tetrafluoroethylene, polyethylene, polypropylene, polyacrylic acid, an ethylene-propylene-diene monomer (EPDM), sulfonated EPDM, styrene-butadiene rubber (SBR), fluororubber, polyacrylic acid, a polymer in which hydrogen atoms of the above polymers are substituted with Li, Na, Ca or the like, various copolymers, and the like may be used.

The conductive material is not particularly limited as long as it does not cause a chemical change in the battery and has conductivity. For example, the conductive material is graphite such as natural graphite, artificial graphite or the like; carbon black such as acetylene black, Ketjen black, channel black, furnace black, lamp black, thermal black or the like; a conductive fiber such as carbon fiber, metallic fiber or the like; a conductive tube such as carbon nanotubes or the like; metallic powder such as carbon fluoride powder, aluminum powder, nickel powder or the like; a conductive whisker such as zinc oxide, potassium titanate or the like; a conductive metal oxide such as titanium oxide or the like; or a conductive material such as a polyphenylene derivative or the like.

The dispersant may be an aqueous dispersant or an organic dispersant such as N-methyl-2-pyrrolidone or the like.

Meanwhile, in the electrode according to the present invention, the first electrode active material layer may have a thickness of 15 to 150 μm, and the second electrode active material layer may have a thickness of 15 to 100 μm.

The electrode according to the present invention may further include, as necessary, a lithium ion-conductive layer and a heat-resistant porous layer on the second electrode active material layer.

FIG. 4 is a diagram of an electrode for a secondary battery according to another embodiment of the present invention.

As shown in FIG. 4, an electrode for a secondary battery E according to the modification of an embodiment of the present invention may include configurations further laminated on a plurality of electrode active material layers. That is, the electrode for a secondary battery E may include a lithium ion-conductive layer 40 laminated on a surface of the electrode active material layer and containing a lithium ion-conductive gel swollen with a non-aqueous electrolyte and a heat-resistant porous layer 50 laminated on a surface of the lithium ion-conductive layer 40 and containing insulating metal oxide particles.

The heat-resistant porous layer 50 serves to prevent an increase in a temperature when an internal short-circuit occurs in a secondary battery to which the electrode according to an embodiment of the present invention is applied.

Meanwhile, when the heat-resistant porous layer 50 is laminated so as to directly come in contact with the electrode active material layer, several problems may occur. That is, when the heat-resistant porous layer 50 is laminated so as to directly come in contact with the electrode active material layer, insulating particles constituting the heat-resistant porous layer 50 may be introduced into pores in the electrode active material layer, and thus electrolyte permeability into the electrode active material layer may be degraded, which results in a degradation of ion conductivity of the electrode active material layer. Also, since conductivity between particles in the electrode active material layer may be degraded, load characteristics of a secondary battery in which an electrode is mounted may be degraded. In addition, since a pinhole is easily generated in the heat-resistant porous layer due to irregularities at a surface of the electrode active material layer formed by electrode active material particles, stability of a secondary battery may be degraded.

A configuration for solving the problems is the lithium ion-conductive layer 40. That is, the lithium ion-conductive layer 40 is laminated on the electrode active material layer, and then the heat-resistant porous layer 50 is laminated thereon to prevent the generation of a pinhole in the heat-resistant porous layer 50 and also prevent the introduction of insulating particles into pores between electrode active material particles.

The electrode according to the present invention may be used as an electrode for a lithium secondary battery, and particularly, may be usefully used as a positive electrode for a lithium secondary battery.

Specifically, the lithium secondary battery includes a positive electrode, a negative electrode disposed at a position facing the positive electrode, a separator interposed between the positive electrode and the negative electrode, and an electrolyte. Here, the positive electrode may be the electrode according to the present invention. Also, the secondary battery may optionally further include a battery container accommodating an electrode assembly composed of the positive electrode, the negative electrode and the separator, and a sealing member for sealing the battery container. Since description of the positive electrode is the same as described above, a detailed description thereof is omitted.

In the lithium secondary battery, the negative electrode includes a negative electrode current collector and a negative electrode active material layer disposed on at least one surface of the negative electrode current collector.

The negative electrode current collector is not particularly limited as long as it does not cause a chemical change in the battery and has high conductivity. For example, the negative electrode current collector is copper, stainless steel, aluminum, nickel, titanium, calcined carbon, or copper or stainless steel whose surface is treated with carbon, nickel, titanium, silver or the like, an aluminum-cadmium alloy or the like. Also, the negative electrode current collector may commonly have a thickness of 3 to 500 µm, and, like the positive electrode current collector, may have fine irregularities at a surface thereof to increase adhesion of a negative electrode active material. For example, the negative electrode current collector may be used in any of various forms such as a film, a sheet, a foil, a net, a porous material, a foam, a non-woven fabric and the like.

The negative electrode active material layer includes a negative electrode active material, and, as necessary, optionally further includes at least one of a binder, a conductive material, and a dispersant.

The negative electrode active material may be a compound capable of reversible intercalation and deintercalation of lithium ions. As a specific example, the negative electrode active material is any one or a mixture of two or more of a carbon material such as artificial graphite, natural graphite, graphitized carbon fiber, amorphous carbon or the like; a metal compound capable of alloying with lithium such as Si, Al, Sn, Pb, Zn, Bi, In, Mg, Ga, Cd, a Si alloy, a Sn alloy, an Al alloy or the like; a metal oxide capable of doping and dedoping lithium ions such as $SiO_v$ (0<v<2), $SnO_2$, vanadium oxide or lithium vanadium oxide; and a composite including the metal compound and the carbon material such as a Si—C composite or a Sn—C composite. Also, the negative electrode active material may be a lithium metal thin-film. In addition, low-crystallinity carbon, high-crystallinity carbon and the like all may be used as the carbon material. A representative example of the low-crystallinity carbon is soft carbon or hard carbon, and a representative example of the high-crystallinity carbon is high-temperature calcined carbon such as amorphous, platy, flake, spherical or fibrous natural graphite or artificial graphite, kish graphite, pyrolytic carbon, mesophase pitch-based carbon fiber, mesocarbon microbeads, mesophase pitches, petroleum or coal tar pitch-derived cokes or the like.

In addition, the binder, the conductive material, and the dispersant may be the same as described above.

Meanwhile, in the lithium secondary battery, the separator serves to separate the negative electrode and the positive electrode and to provide a flow passage for lithium ions. The separator is not particularly limited as long as it is used as a separator in a common lithium secondary battery, and particularly, a separator which exhibits low resistance to migration of electrolyte ions and has an excellent ability of absorbing an electrolyte solution is preferable. Specifically, the separator may be, for example, a porous polymer film made of a polyolefin-based polymer such as an ethylene homopolymer, a propylene homopolymer, an ethylene/butene copolymer, an ethylene/hexene copolymer, an ethylene/methacrylate copolymer or the like, or a stacked structure having two or more layers made thereof. Alternatively, the separator may be a common porous non-woven fabric, for example, a non-woven fabric made of glass fiber with a high melting point, polyethylene terephthalate fiber or the like. Also, in order to ensure heat resistance or mechanical strength, the separator may be a coated separator including ceramic components or polymer materials, and optionally, may be used in a single-layer or multi-layer structure.

In addition, the electrolyte used in the present invention may be an organic liquid electrolyte, an inorganic liquid electrolyte, a solid polymer electrolyte, a gel polymer electrolyte, an inorganic solid electrolyte, a molten-type inorganic electrolyte or the like, which may be used in the manufacture of a lithium secondary battery, but the present invention is not limited thereto.

Specifically, the electrolyte may include an organic solvent and a lithium salt.

The organic solvent is not particularly limited as long as it may act as a medium capable of migrating ions involved in an electrochemical reaction of a battery. Specifically, the organic solvent may be an ester-based solvent such as methyl acetate, ethyl acetate, γ-butyrolactone, ε-caprolactone or the like; an ether-based solvent such as dibutyl ether, tetrahydrofuran or the like; a ketone-based solvent such as cyclohexanone or the like; an aromatic hydrocarbon-based solvent such as benzene, fluorobenzene or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC) or the like; an alcohol-based solvent such as ethyl alcohol, isopropyl alcohol or the like; nitriles such as Ra—CN (Ra is a C2 to C20 hydrocarbon group with a linear, branched or cyclic structure and may include a double-bond aromatic ring or an ether linkage) or the like; amides such as dimethylformamide or the like; dioxolane such as 1,3-dioxolane or the like; or sulfolane. Among these compounds, the carbonate-based solvent is preferable, and a mixture of a cyclic carbonate having high ionic conductivity and a high dielectric constant, which are capable of increasing the charging and discharging performance of a battery (e.g., EC, PC or the like) and a linear carbonate-based compound with low viscosity (e.g., EMC, DMC, DEC or the like) is more preferable. In this case, when the cyclic carbonate and chain carbonate are mixed at a volume ratio of about 1:1 to 9 for use, excellent performance of the electrolyte solution may be exhibited.

The lithium salt is not particularly limited as long as it can provide a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$ or the like. The concentration of the lithium salt preferably is within a range of 0.1 to 2.0 M. When the concentration of the lithium salt is within the above range, an electrolyte has appropriate conductivity and viscosity, and thus excellent performance of the electrolyte may be exhibited and lithium ions may be effectively migrated.

In addition to the electrolyte components, for the purpose of improving lifespan characteristics of the battery, suppressing a decrease in battery capacity, improving discharge capacity of the battery and the like, the electrolyte may further include one or more additives such as a haloalkylene carbonate-based compound such as difluoroethylene carbonate or the like, pyridine, triethyl phosphite, triethanolamine, a cyclic ether, ethylene diamine, n-glyme, hexaphosphoric triamide, nitrobenzene derivatives, sulfur, quinoneimine dyes, N-substituted oxazolidinone, N,N-substituted imidazolidine, ethylene glycol dialkyl ethers, ammonium salts, pyrrole, 2-methoxyethanol, aluminum trichloride and the like. In this case, the additives may be included at 0.1 to 5 wt % with respect to the total weight of the electrolyte.

The secondary battery according to the present invention may be usefully used in portable devices such as mobile phones, notebook PCs, digital cameras and the like and the electric vehicles such as a hybrid electric vehicle (HEV) and the like.

MODE FOR INVENTION

Hereinafter, the present invention will be described in detail with reference to embodiments so that those skilled in the art can easily carry out the present invention. However, the present invention may be implemented in several different forms, and therefore, is not limited to embodiments described herein.

Preparation Example 1

97.5 parts by weight of $Li[Ni_{0.6}Co_{0.2}Mn_{0.2}]O_2$ having an average particle size of 13 μm as a positive electrode active material, 1 part by weight of Denka black as a conductive material, and 1.5 parts by weight of PVDF as a binder were mixed with N-methyl pyrrolidone (NMP) to prepare a positive electrode active material slurry A.

The positive electrode active material slurry A was applied on one surface of an aluminum current collector having a thickness of 70 μm, and then dried at 130° C. to form an electrode active material layer.

Preparation Example 2

97.5 parts by weight of $Li[Ni_{0.6}Co_{0.2}Mn_{0.2}]O_2$ having an average particle size of 7 μm as a positive electrode active material, 1 part by weight of Denka black as a conductive material, and 1.5 parts by weight of PVDF as a binder were mixed with NMP to prepare a positive electrode active material slurry B.

The positive electrode active material slurry B was applied on one surface of an aluminum current collector having a thickness of 70 μm, and then dried at 130° C. to form an electrode active material layer.

Preparation Example 3

97.5 parts by weight of $Li[Ni_{0.8}Co_{0.1}Mn_{0.1}]O_2$ having an average particle size of 11 μm as a positive electrode active material, 1 part by weight of Denka black as a conductive material, and 1.5 parts by weight of PVDF as a binder were mixed with NMP to prepare a positive electrode active material slurry C.

The positive electrode active material slurry C was applied on one surface of an aluminum current collector having a thickness of 65 μm, and then dried at 130° C. to form an electrode active material layer.

Experimental Example 1

Elongation Measurement

Each current collector on which each of electrode active material layers according to Preparation Examples 1 to 3 was formed was cut to prepare a sample with a size of 15 mm (W)×150 mm (L). Afterward, the sample was mounted in a sample-gripping part of an elongation measurement device (Instron 3345 UTM), and then pulled at a rate of 5 mm/min to measure tensile strain. The results thereof are shown in FIG. 5.

As shown in FIG. 5, a layer composed of the current collector and the electrode active material layer prepared using the positive electrode active material slurry A had an elongation of 1.25%, a layer composed of the current collector and the electrode active material layer prepared using the positive electrode active material slurry B had an elongation of 0.9%, and a layer composed of the current collector and the electrode active material layer prepared using the positive electrode active material slurry C had an elongation of 1.47%.

Example 1

The positive electrode active material slurry B according to Preparation Example 2 and the positive electrode active material slurry C according to Preparation Example 3 were applied on an aluminum current collector, dried at 130° C., and then rolled to manufacture a positive electrode including a first electrode active material layer formed by the positive electrode active material slurry B and a second electrode active material layer formed by the positive electrode active material slurry C.

Example 2

The positive electrode active material slurry B according to Preparation Example 2 and the positive electrode active material slurry A according to Preparation Example 1 were applied on an aluminum current collector, dried at 130° C., and then rolled to manufacture a positive electrode including a first electrode active material layer formed by the positive electrode active material slurry B and a second electrode active material layer formed by the positive electrode active material slurry A.

Example 3

The positive electrode active material slurry B according to Preparation Example 2 was applied in two layers on an aluminum current collector, dried at 130° C., and then rolled to manufacture a positive electrode including a first electrode active material layer formed by the positive electrode active material slurry B and a second electrode active material layer formed by the positive electrode active material slurry B.

Comparative Example 1

The positive electrode active material slurry A according to Preparation Example 1 and the positive electrode active material slurry C according to Preparation Example 3 were applied on an aluminum current collector, dried at 130° C., and then rolled to manufacture a positive electrode including a first electrode active material layer formed by the positive electrode active material slurry A and a second electrode active material layer formed by the positive electrode active material slurry C.

Comparative Example 2

The positive electrode active material slurry A according to Preparation Example 1 and the positive electrode active material slurry B according to Preparation Example 2 were applied on an aluminum current collector, dried at 130° C., and then rolled to manufacture a positive electrode including a first electrode active material layer formed by the positive electrode active material slurry A and a second electrode active material layer formed by the positive electrode active material slurry B.

Comparative Example 3

The positive electrode active material slurry A according to Preparation Example 1 was applied in two layers on an aluminum current collector, dried at 130° C., and then rolled to manufacture a positive electrode including a first electrode active material layer formed by the positive electrode active material slurry A and a second electrode active material layer formed by the positive electrode active material slurry A.

Comparative Example 4

The positive electrode active material slurry C according to Preparation Example 3 and the positive electrode active material slurry A according to Preparation Example 1 were applied on an aluminum current collector, dried at 130° C., and then rolled to manufacture a positive electrode including a first electrode active material layer formed by the positive electrode active material slurry C and a second electrode active material layer formed by the positive electrode active material slurry A.

Comparative Example 5

The positive electrode active material slurry C according to Preparation Example 3 and the positive electrode active material slurry B according to Preparation Example 2 were applied on an aluminum current collector, dried at 130° C., and then rolled to manufacture a positive electrode including a first electrode active material layer formed by the positive electrode active material slurry C and a second electrode active material layer formed by the positive electrode active material slurry B.

Comparative Example 6

The positive electrode active material slurry C according to Preparation Example 3 was applied in two layers on an aluminum current collector, dried at 130° C., and then rolled to manufacture a positive electrode including a first electrode active material layer formed by the positive electrode active material slurry C and a second electrode active material layer formed by the positive electrode active material slurry C.

Experimental Example 2

Nail Penetration Test

A porous polyethylene separator was interposed between each positive electrode according to Examples 1 to 3 and Comparative Examples 1 to 6 and a negative electrode to manufacture an electrode assembly.

In this case, the negative electrode was manufactured by mixing natural graphite as a negative electrode active material, carbon black as a conductive material, and PVDF as a binder in a weight ratio of 85:10:5 in NMP as a solvent to prepare a composition for forming a negative electrode active material layer and applying the composition on one surface of a copper current collector.

The electrode assembly thus manufactured was disposed in a case, and then an electrolyte was injected into the inside of the case to manufacture a lithium secondary battery. In this case, the electrolyte was prepared by dissolving 1.0 M lithium hexafluorophosphate ($LiPF_6$) in an organic solvent composed of ethylene carbonate/dimethyl carbonate/ethyl methyl carbonate (volume mixing ratio of EC/DMC/EMC=3/4/3).

The lithium secondary battery thus manufactured was charged to 100% SOC, and then subjected to a nail penetration test in which a 3 mm nail penetrated the battery at a penetration rate of 80 mm/sec to measure whether or not ignition occurs. The measurement results thereof are shown in Table 1 below. A case where ignition occurs was indicated as "○", and a case where ignition does not occur was indicated as "X".

TABLE 1

| Classification | Ignition |
|---|---|
| Example 1 | X |
| Example 2 | X |
| Example 3 | X |
| Comparative Example 1 | ○ |
| Comparative Example 2 | ○ |
| Comparative Example 3 | ○ |
| Comparative Example 4 | ○ |
| Comparative Example 5 | ○ |
| Comparative Example 6 | ○ |

As shown in Table 1, it can be confirmed that, in the case of the lithium secondary batteries using the electrodes according to Examples 1 to 3 in which a layer composed of a current collector and a first electrode active material layer had an elongation of 1.2% or less, ignition did not occur in the nail penetration test, which indicates that stability of the battery is excellent. In comparison, in the case of the secondary batteries using the electrodes according to Comparative Examples 1 to 6 in which a layer composed of a current collector and a first electrode active material layer had an elongation of greater than 1.2%, ignition occurred in the nail penetration test.

As described above, while the present invention has been described with reference to specific embodiments and drawings, the present invention is not limited thereto. It should be clear to those skilled in the art that various modifications and alterations may be made without departing from the spirit and scope of the present invention and equivalents of the appended claims.

The invention claimed is:
1. An electrode for a secondary battery comprising:
an electrode current collector;
a first electrode active material layer formed on the electrode current collector; and
a second electrode active material layer formed on the first electrode active material layer,
wherein a layer composed of the electrode current collector and the first electrode active material layer has an elongation between 0.9% and 1%,
wherein each of the first electrode active material layer and the second electrode active material layer includes a lithium-transition metal oxide as an active material, wherein the lithium-transition metal oxide is represented by Chemical Formula 1 below,

$$Li_{1+x}[Ni_aCo_bMn_c]_{1-x}O_2, \qquad \text{[Chemical Formula 1]}$$

Wherein $-0.2 \le x \le 0.2$, $0.5 \le a \le 0.98$, $0.01 \le b \le 0.4$, and $0.01 \le c \le 0.4$.

2. The electrode of claim 1, wherein the second electrode active material layer has a higher energy density per unit area than that of the first electrode active material layer.

3. The electrode of claim 1, wherein the lithium-transition metal oxides included in the first electrode active material layer and the second electrode active material layer have the same or different compositions.

4. The electrode of claim 1, wherein the first electrode active material layer and the second electrode active material layer each independently have an energy density per unit area of 1 to 6 mAh/cm².

5. The electrode of claim 1, further comprising:
a lithium ion-conductive layer laminated on the second electrode active material layer and containing a lithium ion-conductive gel swollen with a non-aqueous electrolyte; and
a heat-resistant porous layer laminated on a surface of the lithium ion-conductive layer and containing insulating metal oxide particles.

6. A lithium secondary battery comprising the electrode of claim 1.

* * * * *